(12) United States Patent
Schumacher et al.

(10) Patent No.: US 11,015,091 B2
(45) Date of Patent: May 25, 2021

(54) USE OF A SINGLE-COMPONENT LAMINATING ADHESIVE FOR COMPOSITE FILM LAMINATION

(71) Applicant: BASF SE, Ludwigshafen am Rhein (DE)

(72) Inventors: Karl-Heinz Schumacher, Ludwigshafen (DE); Christine Tonhauser, Ludwigshafen (DE); Christoph Kiener, Ludwigshafen (DE); Peter Preishuber-Pfluegl, Ludwigshafen (DE); Andrea Kuntz, Ludwigshafen (DE)

(73) Assignee: BASF SE (DE)

( * ) Notice: Subject to any disclaimer, the term of this patent is extended or adjusted under 35 U.S.C. 154(b) by 0 days.

(21) Appl. No.: 16/069,320

(22) PCT Filed: Jan. 10, 2017

(86) PCT No.: PCT/EP2017/050365
§ 371 (c)(1),
(2) Date: Jul. 11, 2018

(87) PCT Pub. No.: WO2017/125277
PCT Pub. Date: Jul. 27, 2017

(65) Prior Publication Data
US 2019/0016931 A1 Jan. 17, 2019

(30) Foreign Application Priority Data
Jan. 18, 2016 (EP) ..................... 16151707

(51) Int. Cl.
*C09J 133/10* (2006.01)
*B32B 7/12* (2006.01)
(Continued)

(52) U.S. Cl.
CPC .............. *C09J 133/10* (2013.01); *B32B 7/12* (2013.01); *B32B 15/08* (2013.01); *B32B 15/085* (2013.01); *B32B 15/088* (2013.01); *B32B 15/09* (2013.01); *B32B 15/20* (2013.01); *B32B 23/04* (2013.01); *B32B 23/042* (2013.01); *B32B 23/08* (2013.01); *B32B 27/06* (2013.01); *B32B 27/08* (2013.01); *B32B 27/16* (2013.01); *B32B 27/28* (2013.01); *B32B 27/30* (2013.01); *B32B 27/32* (2013.01); *B32B 27/34* (2013.01); *B32B 27/36* (2013.01); *B32B 37/12* (2013.01); *C09J 4/00* (2013.01); *C09J 133/06* (2013.01); *C09J 133/08* (2013.01);
(Continued)

(58) Field of Classification Search
CPC ..................................................... C09J 133/10
See application file for complete search history.

(56) References Cited

U.S. PATENT DOCUMENTS

| 4,609,420 A | 9/1986 | Aydin et al. |
| 2004/0168762 A1* | 9/2004 | Fricke .................. C08F 220/18 |
| | | 156/275.5 |

(Continued)

FOREIGN PATENT DOCUMENTS

| CN | 102939310 A | 2/2013 |
| DE | 2061213 | 6/1971 |

(Continued)

OTHER PUBLICATIONS

International Search Report dated Apr. 6, 2017, in PCT/EP2017/050365, filed Jan. 10, 2017.

*Primary Examiner* — Daniel H Lee
(74) *Attorney, Agent, or Firm* — Faegre Drinker Biddle & Reath LLP

(57) ABSTRACT

A description is given of the use of a one-component laminating adhesive for composite film lamination, and also of a method for composite film lamination. The laminating adhesive comprises an aqueous polymer dispersion preparable by radical emulsion polymerization of monomers comprising (a) at least 60 wt %, based on the total amount of monomers, of at least one monomer selected from the group consisting of C1 to C20 alkyl acrylates, C1 to C20 alkyl methacrylates, vinyl esters of carboxylic acids comprising up to 20 carbon atoms, vinylaromatics having up to 20 carbon atoms, vinyl halides, vinyl ethers of alcohols comprising 1 to 10 carbon atoms, aliphatic hydrocarbons having 2 to 8 carbon atoms and one or two double bonds, and mixtures of these monomers, and (b) at least 0.1 wt %, based on the total amount of monomers, of at least one monomer having at least one acid group, and (c) 0.1 to 5 wt %, based on the total amount of monomers, of at least one ethylenically unsaturated compound having at least one functional group selected from keto groups and aldehyde groups; where the aqueous polymer dispersion comprises at least one compound A which has at least two functional groups that are able to enter into a crosslinking reaction with keto groups or with aldehyde groups; where the molar ratio of the groups of the compound A that are reactive with keto groups or with aldehyde groups to the keto and aldehyde groups of the monomer (b) is from 1:10 to 2:1; and where, in the composite film lamination, at least two films are bonded to one another with the laminating adhesive so firmly that the peel strength is 2.5 N/15 mm or more or that the films bonded to one another are partable only with destruction of at least one of the films. The composite films can be used for the packing of foods.

19 Claims, No Drawings

(51) Int. Cl.
*B32B 27/36* (2006.01)
*C09J 133/06* (2006.01)
*B32B 27/30* (2006.01)
*C09J 4/00* (2006.01)
*B32B 23/04* (2006.01)
*B32B 15/08* (2006.01)
*B32B 27/32* (2006.01)
*B32B 27/34* (2006.01)
*B32B 15/20* (2006.01)
*B32B 27/08* (2006.01)
*B32B 23/08* (2006.01)
*B32B 15/088* (2006.01)
*B32B 27/16* (2006.01)
*B32B 27/28* (2006.01)
*B32B 27/06* (2006.01)
*B32B 15/085* (2006.01)
*B32B 15/09* (2006.01)
*B32B 37/12* (2006.01)
*C09J 133/08* (2006.01)

(52) U.S. Cl.
CPC ....... *B32B 2250/02* (2013.01); *B32B 2250/24* (2013.01); *B32B 2255/06* (2013.01); *B32B 2255/10* (2013.01); *B32B 2255/205* (2013.01); *B32B 2255/26* (2013.01); *B32B 2307/308* (2013.01); *B32B 2307/4023* (2013.01); *B32B 2307/514* (2013.01); *B32B 2307/732* (2013.01); *B32B 2307/748* (2013.01); *B32B 2307/75* (2013.01); *B32B 2439/70* (2013.01); *B32B 2553/00* (2013.01)

(56) References Cited

U.S. PATENT DOCUMENTS

2005/0192394 A1* 9/2005 Jung ............... C08F 265/06
 524/458
2009/0252959 A1* 10/2009 Schumacher ........... C09J 7/385
 428/355 EN

FOREIGN PATENT DOCUMENTS

| DE | 2207209 | 10/1972 |
| DE | 2722097 A1 | 11/1978 |
| EP | 0148386 A1 | 7/1985 |
| EP | 2636714 A1 | 9/2013 |
| JP | 8-2538 A | 1/1996 |
| WO | WO 98/23656 A1 | 6/1998 |
| WO | WO 00/50480 A1 | 8/2000 |
| WO | WO 2006/066761 A1 | 6/2006 |
| WO | WO 2011/154920 A1 | 12/2011 |

* cited by examiner

USE OF A SINGLE-COMPONENT LAMINATING ADHESIVE FOR COMPOSITE FILM LAMINATION

The invention relates to the use of a particular one-component laminating adhesive for composite film lamination, and also to a method for composite film lamination. The composite films may be used with particular advantage for the packaging of foods.

There is a great demand for cost-effective adhesives for composite film lamination with good performance properties, for flexible food packaging, for example. Widespread within this application are adhesive systems based on organic solvents. With the aim of reducing organic solvent emissions, water-based adhesive systems represent one alternative. Particular significance is possessed by acrylate ester polymer dispersions, also known as acrylate latexes. Adhesives based on acrylate esters are described in WO 98/23656 and in WO 00/50480, for example.

There are numerous applications requiring the adhesive used to be highly resistant to heat, such as in film laminates for hot dispensing operations or for sterilizable or pasteurizable food packaging, for example. Moreover, numerous laminates require an adhesive with a high resistance to chemicals originating from printing inks which are in direct contact with the adhesive, or to chemicals which may migrate from the packaged contents through the inner films into the adhesive. Where aqueous adhesives are used, these heat and chemical resistance requirements are nowadays customarily produced by incorporating an external chemical crosslinker into the dispersion. Water-emulsifiable isocyanates, in particular, are used here. A two-component adhesive system of this kind generally has the disadvantage of a limited pot life within which the adhesive must be processed. The pot life is in general between one and ten hours. If this pot life is exceeded, there is a risk of coagulum forming in the adhesive and the risk of an increase in viscosity, possibly leading to problems with the industrial coating of the adhesive on a film carrier. With two-component adhesives of this kind, moreover, there is a danger of mixing errors occurring during mixing and adversely affecting proper crosslinking of the adhesive.

As an improvement for the adhesion of layers of adhesive applied from an aqueous environment to olefin surfaces, the addition of a dihydrazide component to the dispersion is known from EP148386. WO 2006/066761 describes keto- or aldehyde-functionalized emulsion polymers which enter into a crosslinking reaction, during filming, with a second component which is present in the dispersion liquid, and which are used for self-adhesive, easily redetachable flexible-PVC films. The emulsion polymers described therein are used as pressure sensitive adhesives (PSAs) and are distinguished by a comparatively high film tack. The film tack may be described in the form of a loop tack. The loop tack on steel is customarily well above 1.7 N/25 mm and can be up to 10 N/25 mm. Laminating adhesives and dispersions for use in composite film lamination are not pressure sensitive adhesives, and have only very little or no tack, specifically having a loop tack of preferably less than 1.7 N/25 mm on steel.

The object of the present invention was to provide a one-component aqueous laminating adhesive for composite film lamination that has a heat resistance and chemical resistance of the kind achieved with customary two-component aqueous adhesives for these applications, and that leads to solid film composites which are not easily removable from one another again.

It has been found that the object can be achieved by use of the laminating adhesive elucidated in more detail hereinafter. A subject of the invention is the use of a one-component laminating adhesive for composite film lamination,
where the laminating adhesive is present in the form of an aqueous polymer dispersion, and the aqueous polymer dispersion comprises polymer particles in dispersion in water that are preparable by radical emulsion polymerization of monomers comprising a) at least 60 wt %, based on the total amount of monomers, of at least one monomer selected from the group consisting of C1 to C20 alkyl acrylates, C1 to C20 alkyl methacrylates, vinyl esters of carboxylic acids comprising up to 20 carbon atoms, vinylaromatics having up to 20 carbon atoms, vinyl halides, vinyl ethers of alcohols comprising 1 to 10 carbon atoms, aliphatic hydrocarbons having 2 to 8 carbon atoms and one or two double bonds, and mixtures of these monomers, and b) at least 0.1 wt %, based on the total amount of monomers, of at least one monomer having at least one acid group, and c) 0.1 to 5 wt %, preferably 0.5 to 5 wt %, based on the total amount of monomers, of at least one ethylenically unsaturated compound having at least one functional group selected from keto groups and aldehyde groups;

where the aqueous polymer dispersion comprises at least one compound A which has at least two functional groups that are able to enter into a crosslinking reaction with the keto groups or with the aldehyde groups;

where the molar ratio of the groups of the compound A that are reactive with keto groups or with aldehyde groups to the keto and aldehyde groups of the monomer b) is from 1:10 to 2:1;

where, in the composite film lamination, at least two films are bonded to one another with the laminating adhesive so firmly that the peel strength is 2.5 N/15 mm or more, or 3 N/15 mm or more, or that the films bonded to one another are partable only with destruction of at least one of the films.

The aqueous polymer dispersion of the invention further comprises a compound which includes at least two functional groups able to enter into a crosslinking reaction with the keto or aldehyde group. For optimum crosslinking, the amount of this second component is selected such that one molecule of the second component constructs a bridging chemical compound with two keto or aldehyde functions of the first component.

Another subject of the invention is a method for producing composite films by bonding to one another at least two films using the one-component, non-self-adhesive laminating adhesive or using the aqueous polymer dispersion, preferably with application of pressure and elevated temperature.

Another subject of the invention is the use of the composite films obtainable in accordance with the invention for the packaging of foods, preferably in flexible packaging.

Another subject of the invention is the use of the aqueous polymer dispersions as an adhesive, more particularly as a laminating adhesive, for the production, for example, of composite films for the packaging of foods.

Another subject of the invention is a composite film which has a first film and at least one second film, which are bonded to one another using the laminating adhesive described herein and comprising an aqueous polymer dispersion for use in accordance with the invention.

The text below occasionally uses the designation "(meth) acryl . . . " and similar designations as an abbreviated notation for "acryl . . . or methacryl . . . ". In the designation Cx alkyl (meth)acrylate and analogous designations, x denotes the number of the carbon atoms of the alkyl group.

The glass transition temperature can be determined by Differential Scanning calorimetry (ASTM D 3418-08, midpoint temperature). The glass transition temperature of the polymer in the polymer dispersion is the glass transition temperature obtained when evaluating the second heating curve (heating rate 20° C./min).

One-component adhesives are adhesives with which no external crosslinker (such as isocyanate crosslinker, for example) is added immediately prior to their use. In the case of composite film production there is preferably also no UV crosslinking, and the laminating adhesive preferably comprises no UV-crosslinkable components.

The laminating adhesive is preferably not self-adhesive. Non-self-adhesive adhesives are adhesives which in contrast to pressure sensitive adhesives exhibit only very little tack, or none, at room temperature and are employed preferably with application of pressure and/or elevated temperature. The tack, measured as loop tack, is preferably less than 1.7 N/25 mm (adhesive in an applied thickness of 20 µm, applied to a polyester film 12 µm thick, measured on steel at room temperature (20° C.) with a removal velocity of 300 mm/min).

The polymer dispersions used in accordance with the invention are obtainable by radical emulsion polymerization of ethylenically unsaturated, radically polymerizable compounds (monomers).

This polymerization takes place preferably without emulsifier or with little emulsifier in the sense that less than 1 part by weight of emulsifier or less than 0.8, preferably less than or equal to 0.5, part by weight of emulsifier is added per 100 parts by weight of monomers in order to stabilize the polymer dispersion of the invention. Emulsifiers are non-polymeric, amphiphilic, surface-active substances that are added to the polymerization mixture before or after the polymerization. Small amounts of emulsifiers, originating for example from the use of emulsifier-stabilized polymer seed, are not detrimental in this context. Also possible is the use in total of less than 0.3 part by weight or less than 0.2 part by weight of emulsifier, as for example of 0.05 to less than 1 part by weight, of 0.05 to less than 0.8 part by weight, of 0.05 to 0.5 part by weight, or of 0.05 to 0.3 part by weight, based on 100 parts by weight of monomers, or no emulsifier.

A comprehensive description of suitable protective colloids is found in Houben-Weyl, Methoden der organischen Chemie, volume XIV/1, Makromolekulare Stoffe, Georg-Thieme-Verlag, Stuttgart, 1961, pp. 411 to 420. Emulsifiers contemplated include anionic, cationic and nonionic emulsifiers. Preferred for use as surface-active substances are emulsifiers, whose molecular weights, in contrast to the protective colloids, are typically below 2000 g/mol. Where mixtures of surface-active substances are used, the individual components must of course be compatible with one another, something which in case of doubt can be checked by means of a few preliminary tests. Preference is given to using anionic and nonionic emulsifiers as surface-active substances. Common accompanying emulsifiers are, for example, ethoxylated fatty alcohols (EO level: 3 to 50, alkyl radical: $C_8$ to $C_{36}$), ethoxylated mono-, di- and trialkylphenols (EO level: 3 to 50, alkyl radical: $C_4$ to $C_9$), alkali metal salts of dialkyl esters of sulfosuccinic acid and also alkali metal and ammonium salts of alkyl sulfates (alkyl radical: $C_8$ to $C_{12}$), of ethoxylated alkanols (EO level: 4 to 30, alkyl radical: $C_{12}$ to $C_{18}$), of ethoxylated alkylphenols (EO level: 3 to 50, alkyl radical: $C_4$ to $C_9$), of alkylsulfonic acids (alkyl radical: $C_{12}$ to $C_{18}$) and of alkylarylsulfonic acids (alkyl radical: $C_9$ to $C_{18}$).

Further suitable emulsifiers are compounds of the general formula

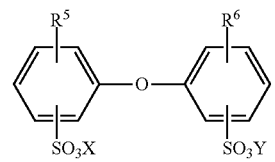

in which R5 and R6 are hydrogen or C4 to C14 alkyl and are not simultaneously hydrogen, and X and Y may be alkali metal ions and/or ammonium ions. With preference R5 and R6 are linear or branched alkyl radicals having 6 to 18 carbon atoms, or are hydrogen, and in particular they have 6, 12 and 16 carbon atoms, with R5 and R6 not both simultaneously being hydrogen. X and Y are preferably sodium, potassium, or ammonium ions, with sodium being particularly preferred. Particularly advantageous compounds are those in which X and Y are sodium, R5 is a branched alkyl radical having 12 carbon atoms, and R6 is hydrogen or R5. Use is frequently made of technical mixtures containing a fraction of 50 to 90 wt % of the monoalkylated product. Commercial products of suitable emulsifiers are for example Dowfax®2 A1, Emulan® NP 50, Dextrol® OC 50, Emulgator 825, Emulgator 825 S, Emulan® OG, Texapon® NSO, Nekanil® 904 S, Lumiten® I-RA, Lumiten® E 3065, Disponil® FES 77, Lutensol® AT 18, Steinapol® VSL, Emulphor® NPS 25. For the present invention, ionic emulsifiers or protective colloids are preferred. Particular preference is given to ionic emulsifiers, especially salts and acids, such as carboxylic acids, sulfonic acids and sulfates, sulfonates or carboxylates. In particular it is also possible to use mixtures of ionic and nonionic emulsifiers.

The polymerization may also take place in the presence of a protective colloid. Protective colloids are polymeric compounds which on solvation bind large quantities of water and are capable of stabilizing dispersions of water-insoluble polymers. In contrast to emulsifiers, they generally do not lower the interfacial tension between polymer particles and water. The number-average molecular weight of protective colloids is situated, for example, at above 1000 g/mol.

Monomers a)

The monomer mixture consists of at least 60 wt %, preferably at least 80 wt %, as for example from 60 to 99.8 wt % or from 80 to 98 wt %, more preferably at least 90 wt %, based on the total amount of monomers, of at least one monomer a) selected from the group consisting of C1 to C20 alkyl acrylates, C1 to C20 alkyl methacrylates, vinyl esters of carboxylic acids comprising up to 20 carbon atoms, vinylaromatics having up to 20 carbon atoms, vinyl halides, vinyl ethers of alcohols comprising 1 to 10 carbon atoms, aliphatic hydrocarbons having 2 to 8 carbon atoms and one or two double bonds, and mixtures of these monomers.

Suitable monomers a) are, for example, alkyl (meth)acrylates with a $C_1$-$C_{10}$ alkyl radical, such as methyl methacrylate, methyl acrylate, n-butyl acrylate, ethyl acrylate and 2-ethylhexyl acrylate, and also behenyl (meth)acrylate, isobutyl acrylate, tert-butyl (meth)acrylate, and cyclohexyl (meth)acrylate. In particular, mixtures of the alkyl (meth) acrylates are also suitable. Vinyl esters of carboxylic acids having 1 to 20 carbon atoms are, for example, vinyl laurate, vinyl stearate, vinyl propionate, Versatic acid vinyl esters, and vinyl acetate. Useful vinylaromatic compounds include vinyltoluene, alpha- and para-methylstyrene, alpha-butylstyrene, 4-n-butylstyrene, 4-n-decylstyrene and, preferably, styrene. The vinyl halides are ethylenically unsaturated compounds substituted by chlorine, fluorine or bromine, preferably vinyl chloride and vinylidene chloride. Examples of vinyl ethers which may be mentioned are vinyl methyl ether or vinyl isobutyl ether. Preference is given to vinyl ethers of alcohols comprising 1 to 4 carbon atoms. Hydrocarbons having 4 to 8 carbon atoms and two olefinic double bonds include butadiene, isoprene and chloroprene. Preferred as monomers a) are the $C_1$ to $C_{10}$ alkyl acrylates and methacrylates, more particularly $C_1$ to $C_8$ alkyl acrylates and methacrylates, and also styrene, and mixtures thereof. Especially preferred are methyl acrylate, methyl methacrylate, ethyl acrylate, n-butyl acrylate, n-butyl methacrylate, n-hexyl acrylate, octyl acrylate, 2-ethylhexyl acrylate, 2-propylheptyl acrylate, styrene, and also mixtures of these monomers.

Monomers b)

The monomer mixture consists to an extent of at least 0.1 wt %, more particularly from 0.1 to 5 wt % or from 0.5 to 3 wt %, based on the total amount of monomers, of at least one ethylenically unsaturated monomer having at least one acid group (acid monomer). The acid monomers b) comprise monomers which comprise at least one acid group, and also their anhydrides and salts thereof. The monomers b) include alpha,beta-monoethylenically unsaturated monocarboxylic and dicarboxylic acids, monoesters of alpha,beta-monoethylenically unsaturated dicarboxylic acids, the anhydrides of the aforesaid alpha,beta-monoethylenically unsaturated carboxylic acids, and also ethylenically unsaturated sulfonic acids, phosphonic acids or dihydrogenphosphates and their water-soluble salts, as for example their alkali metal salts. Examples thereof are acrylic acid, methacrylic acid, itaconic acid, maleic acid, fumaric acid, crotonic acid, vinylacetic acid, and vinyllactic acid. Examples of suitable ethylenically unsaturated sulfonic acids include vinylsulfonic acid, styrenesulfonic acid, acrylamidomethylpropanesulfonic acid, sulfopropyl acrylate and sulfopropyl methacrylate. Preferred monomers b) are alpha,beta-monoethylenically unsaturated C3-C8 carboxylic acids and C4-C8 dicarboxylic acids, e.g., itaconic acid, crotonic acid, vinylacetic acid, acrylamidoglycolic acid, acrylic acid and methacrylic acid, and also their anhydrides. Particularly preferred monomers b) are itaconic acid, acrylic acid and methacrylic acid, and mixtures thereof.

Monomers c)

In the present invention, the polymer dispersion comprises keto or aldehyde groups. The keto or aldehyde groups may be bonded to the polymer through copolymerization of suitable monomers c). The monomer mixture consists to an extent of at least 0.1 wt %, or to an extent of at least 0.2 wt %, as for example of 0.1 to 5 wt %, or of 0.2 to 5 wt %, of ethylenically unsaturated monomers having at least one functional group selected from keto groups and aldehyde groups.

Examples of monomers c) are acrolein, methacrolein, vinyl alkyl ketones having 1 to 20, preferably 1 to 10, carbon atoms in the alkyl radical, formylstyrene, (meth)acrylic acid alkyl esters having one or two keto or aldehyde groups, or one aldehyde and one keto group in the alkyl radical, with the alkyl radical preferably comprising a total of 3 to 10 carbon atoms, examples being (meth)acryloyloxyalkylpropanals, as described for example in DE-A 2 722 097. Also suitable, furthermore, are N-oxoalkyl(meth)acrylamides of the kind known, for example, from DE-A 2 061 213 or DE-A 2 207 209, examples being those of the formula R—C(=O)—R'—NH—C(=O)—CR"=CH$_2$, in which R and R" independently of one another are hydrogen or a hydrocarbyl group (preferably alkyl) having 1 to 10 carbon atoms, and R' is a hydrocarbyl group (preferably alkylene) having 2 to 15 carbon atoms. Particularly preferred are acetoacetyl (meth)acrylate, acetoacetoxyethyl (meth)acrylate, and, in particular, diacetoneacrylamide.

Monomers d)

The monomer mixture may optionally comprise at least one further monomer d), which is different from the monomers a) to c). The monomers d) may be used, for example, in amounts from 0 to 10 wt % or from 0 to 5 wt %, more particularly from 0.1 to 10 wt % or from 0.1 to 5 wt % or from 0.2 to 3 wt %, based on the total amount of monomers.

Monomers d) are, for example, neutral and/or nonionic monomers with increased solubility in water, examples being the amides or the N-alkylolamides of the aforesaid carboxylic acids, as for example acrylamide, methacrylamide, N-methylolacrylamide and N-methylolmethacrylamide, or phenyloxyethyl glycol mono(meth)acrylate. Further monomers d) are also, for example, monomers comprising hydroxyl groups, more particularly the hydroxyalkyl esters of the aforesaid alpha,beta-monoethylenically unsaturated carboxylic acids, preferably $C_1$-$C_{10}$ hydroxyalkyl (meth)acrylates such as, for example, hydroxyethyl acrylate, hydroxyethyl methacrylate, hydroxypropyl acrylate or hydroxypropyl methacrylate, and also 4-hydroxybutyl acrylate. Further monomers d) are also, for example, monomers comprising amino groups, more particularly the aminoalkyl esters of the aforesaid alpha,beta-monoethylenically unsaturated carboxylic acids, preferably $C_1$-$C_{10}$ aminoalkyl(meth)acrylates such as, for example, 2-aminoethyl(meth)acrylate or tert-butylaminoethyl methacrylate. Additionally contemplated as monomers d) are the nitriles of alpha,beta-monoethylenically unsaturated C3-C8 carboxylic acids, such as acrylonitrile or methacrylonitrile, for example. Other suitable monomers d) are bifunctional monomers which as well as an ethylenically unsaturated double bond have at least one glycidyl group, oxazoline group, ureido group or ureidoanalogous group. Examples of glycidyl group monomers are ethylenically unsaturated glycidyl ethers and glycidyl esters, e.g., vinyl, allyl and methallyl glycidyl ethers, and glycidyl (meth)acrylate. Examples of monomers d) are also crosslinking monomers which have more than one radically polymerizable group, more particularly two or more (meth)acrylate groups, such as butanediol di(meth)acrylate or allyl methacrylate, for example. Particularly preferred monomers d) are hydroxyalkyl (meth)acrylates having 1 to 10 carbon atoms in the alkyl group.

Compound A

The dispersions for use in accordance with the invention further comprise at least one compound A having at least 2 functional groups, more particularly 2 to 5 functional groups, which enter into a crosslinking reaction with the keto or aldehyde groups. Examples of compounds which are able to enter into a crosslinking reaction with the keto or aldehyde groups are compounds having hydrazide, hydroxylamine, oxime ether or amino groups. Suitable compounds having hydrazide groups are, for example, polycarboxylic hydrazides having a molar weight of preferably up to 500 g/mol. Preferred hydrazide compounds are dicarboxylic dihydrazides having preferably 2 to 10 carbon atoms. Examples include oxalic dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide and/or isophthalic dihydrazide. Particularly preferred are adipic dihydrazide, sebacic dihydrazide and isophthalic dihydrazide. Examples of suitable compounds having amino groups are ethylenediamine, propylenediamine, tetramethylenediamine, pentamethylenediamine, hexamethylenediamine, diethylenetriamine, triethylenetetramine, polyethyleneimines, partly hydrolyzed polyvinylformamides, ethylene oxide and propylene oxide adducts such as the "Jeffamines", cyclohexanediamine and xylylenediamine. The compound having the functional groups may be added at any point in time to the composition, or to the dispersion of the polymer. In the aqueous dispersion there is as yet no crosslinking with the keto or aldehyde groups. Crosslinking occurs on the coated substrate only in the course of drying.

With preference compound A is adipic dihydrazide and monomer c) is diacetoneacrylamide.

The amount of the compound having the functional groups is preferably made such that the molar ratio of the functional groups that are reactive with keto and/or aldehyde groups to the keto and/or aldehyde groups of the polymer is 1:10 to 2:1, more particularly 1:5 to 2:1, more preferably 1:2 to 2:1, and very preferably 1:1.3 to 1.3:1. Especially preferred are equimolar amounts of the functional groups and of the keto and/or aldehyde groups.

Preferably the polymer particles of the polymer dispersion for use in accordance with the invention are produced from monomers comprising a) 90 to 99.4 wt % or 90 to 98 wt %, based on the total amount of monomers, of at least one monomer selected from the group consisting of C1 to C8 alkyl acrylates, C1 to C8 alkyl methacrylates, and styrene, and mixtures of these monomers, and b) 0.5 to 3 wt %, based on the total amount of monomers, of at least one monomer selected from the group consisting of acrylic acid, methacrylic acid, and itaconic acid, and c) 0.1 to 5 wt %, based on the total amount of monomers, of at least one ethylenically unsaturated compound having at least one keto group, selected from the group consisting of acetoacetyl (meth)acrylate, acetoacetoxyethyl (meth) acrylate, and diacetoneacrylamide;

d) 0 to 5 wt %, based on the total amount of monomers, of other monomers, different from the monomers a) to c), selected from the group consisting of acrylamide, methacrylamide, N-methylolacrylamide and N-methylolmethacrylamide, phenyloxyethyl glycol mono(meth)acrylate, monomers comprising hydroxyl groups, monomers comprising amino groups, nitriles of alpha,beta-monoethylenically unsaturated C3-C8 carboxylic acids, bifunctional monomers which as well as an ethylenically unsaturated double bond have at least one glycidyl group, oxazoline group, ureido group or ureido-analogous group, and crosslinking monomers which have more than one radically polymerizable group, and where compound A is a dicarboxylic dihydrazide having 2 to 10 carbon atoms.

The monomers of the polymerization are preferably selected such that the glass transition temperature is in the range from −40° C. to +15° C., more particularly from −35° C. to +10° C. or from −10° C. to +10° C. By purposive variation of monomer type and quantity, those skilled in the art are able according to the invention to prepare aqueous polymeric compositions whose polymers have a glass transition temperature in the desired range. Orientation is possible by means of the Fox equation. According to Fox (T. G. Fox, Bull. Am. Phys. Soc. 1956 [Ser. II] 1, page 123, and according to Ullmann's Encyclopädie der technischen Chemie, Vol. 19, page 18, 4th edition, Verlag Chemie, Weinheim, 1980), the glass transition temperature of copolymers is calculated to a good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures in degrees kelvin of the polymers synthesized from only one of the monomers 1, 2, ... n at a time. The $T_g$ values for the homopolymers of the majority of monomers are known and are listed for example in Ullmann's Encyclopedia of Industrial Chemistry, Vol. A21, 5th edition, page 169, VCH Weinheim, 1992; further sources for glass transition temperatures of homopolymers are, for example, J. Brandrup, E. H. Immergut, Polymer Handbook, 1$^{st}$ Ed., J. Wiley, New York 1966, 2$^{nd}$ Ed. J. Wiley, New York 1975, and 3$^{rd}$ Ed. J. Wiley, New York 1989.

In one embodiment of the invention the polymerization takes place with use of at least one chain transfer agent. By this means it is possible to reduce the molar mass of the emulsion polymer through a chain termination reaction. The chain transfer agents are bonded to the polymer in this procedure, generally to the chain end. The amount of the chain transfer agents is especially 0.05 to 4 parts by weight, more preferably 0.05 to 0.8 part by weight, and very preferably 0.1 to 0.6 part by weight, per 100 parts by weight of the monomers to be polymerized. Suitable chain transfer agents are, for example, compounds having a thiol group such as tert-butyl mercaptan, thioglycolic acid ethylhexyl ester, mercaptoethanol, mercaptopropyltrimethoxysilane or tert-dodecyl mercaptan. The chain transfer agents are generally compounds of low molecular mass, having a molar weight of less than 2000, more particularly less than 1000 g/mol. Preferred are 2-ethylhexyl thioglycolate (EHTG), isooctyl 3-mercaptopropionate (IOMPA) and tert-dodecyl mercaptan (tDMK).

The polymerization takes place preferably with seed control, i.e., in the presence of polymer seed (seed latex). Seed latex is an aqueous dispersion of finely divided polymer particles having an average particle diameter of preferably 20 to 40 nm. Seed latex is used in an amount of preferably 0.01 to 0.5 part by weight, more preferably of 0.03 to 0.3 part by weight, per 100 parts by weight of monomers. Suitability is possessed for example by a latex based on polystyrene or based on polymethyl methacrylate. A preferred seed latex is polystyrene seed.

The polymer dispersion of the invention is prepared by emulsion polymerization. Emulsion polymerization comprises polymerizing ethylenically unsaturated compounds (monomers) in water using typically ionic and/or nonionic emulsifiers and/or protective colloids or stabilizers as surface-active compounds to stabilize the monomer droplets and the polymer particles subsequently formed from the monomers. Preferably, however, the polymerization takes place with little emulsifier and without addition or formation of protective colloids. The resulting polymer dispersion can be stabilized by a specific regime. This regime is based on a slow initial monomer feed in the presence of a very small amount of polymer seed (seed control), followed by the neutralization of the acid monomers used in the course of or after the polymerization.

Acid groups in the polymer are neutralized preferably by the feeding of a neutralizing agent during or after the polymerization, with the acid groups being neutralized wholly or partly by the feeding of a base. The neutralizing agent may be added, for example, in a separate feed parallel to the feeding of the monomer mixture. After feeding of all of the monomers, the polymerization vessel preferably comprises the amount of neutralizing agent required for neutralizing at least 10% and preferably 10% to 100% or 25% to 90% acid equivalents. The particularly preferred neutralizing agent is ammonia.

The emulsion polymerization may be initiated using water-soluble initiators. Examples of water-soluble initiators are ammonium salts and alkali metal salts of peroxodisulfuric acid, e.g., sodium peroxodisulfate, hydrogen peroxide, or organic peroxides, e.g., tert-butyl hydroperoxide. Also suitable as initiator are reduction-oxidation (redox) initiator systems. Redox initiator systems consist of at least one generally inorganic reducing agent and an inorganic or organic oxidizing agent. The oxidant component is, for example, the emulsion polymerization initiators already mentioned hereinabove. The reductant components are, for example, alkali metal salts of sulfurous acid, for example sodium sulfite, sodium hydrogensulfite, alkali metal salts of disulfurous acid such as sodium disulfite, bisulfite addition compounds of aliphatic aldehydes and ketones, such as acetone bisulfite, or reducing agents such as hydroxymethanesulfinic acid and the salts thereof, or ascorbic acid. The redox initiator systems may be employed with co-use of soluble metal compounds whose metallic component can occur in a plurality of valence states. Typical redox initiator systems are, for example, ascorbic acid/iron(II) sulfate/sodium peroxydisulfate, tert-butyl hydroperoxide/sodium disulfite, tert-butyl hydroperoxide/sodium hydroxymethanesulfinate. The individual components, for example the reductant component, may also be mixtures, for example a mixture of the sodium salt of hydroxymethanesulfinic acid and sodium disulfite.

The initiators cited are generally employed in the form of aqueous solutions, the lower concentration limit being determined by the amount of water acceptable in the dispersion and the upper limit being determined by the solubility in water of the particular compound. The concentration of the initiators is generally from 0.1 to 30 wt %, preferably from 0.5 to 20 wt % and more preferably from 1.0 to 10 wt % based on the monomers to be polymerized. It is also possible to use two or more different initiators in the emulsion polymerization.

The emulsion polymerization takes place preferably at 30 to 130° C., preferably at 50 to 90° C. The polymerization medium may consist either solely of water or of mixtures of water and liquids miscible therein such as methanol. Preference is given to using solely water. The emulsion polymerization may be carried out in the form of a feed process, including staged or gradient regimes. In the polymerization, a polymer seed can be introduced initially for more effective establishment of the particle size.

The manner in which the initiator is added to the polymerization vessel over the course of the radical aqueous emulsion polymerization is known to those of ordinary skill in the art. It may be either initially charged to the polymerization vessel in its entirety or employed continuously or in a staged manner at the rate of its consumption over the course of the radical aqueous emulsion polymerization. This specifically depends on the chemical nature of the initiator system and on the polymerization temperature. Preference is given to initially charging a portion and supplying the remainder to the polymerization zone at the rate of its consumption. In order to remove the residual monomers, it is common after the end of the emulsion polymerization proper, i.e., after a monomer conversion of at least 95%, to add initiator as well. In the feed process, the individual components may be added to the reactor from above, from the side or from below through the reactor floor.

The emulsion polymerization generally affords aqueous dispersions of the polymer having solids contents of from 15 to 75 wt %, preferably from 40 to 60 wt % and more preferably not less than 50 wt %.

The pH of the polymer dispersion is preferably adjusted to a pH greater than 5, more particularly to a pH of between 5.5 and 8.

The polymer dispersions in accordance with the invention can be used in aqueous adhesive preparations, for the production, for example, of laminates, i.e., in aqueous laminating adhesive preparations for the bonding of substrates of large surface area, more particularly for the production of composite films.

The present invention also relates to a method for producing composite films by bonding to one another at least two films using the above-described one-component laminating adhesive.

In this method, the aqueous polymer dispersions may be used as they are or after formulation with customary auxiliaries. Examples of customary auxiliaries are wetting agents, thickeners, light stabilizers, biocides, defoamers, and so on.

In the method for producing composite films, at least two films are bonded to one another using the aqueous polymer dispersion. In this method, the polymer dispersion of the invention, or a preparation formulated accordingly, is applied to the large-surface-area substrates to be bonded, preferably with a layer thickness of 0.1 to 20 g/m$^2$, more preferably 1 to 7 g/m$^2$, by means, for example, of knife coating, spreading, etc. Customary coating techniques may be employed, examples being roller coating, reverse roller coating, gravure roller coating, reverse gravure roller coating, brush coating, rod coating, spray coating, airbrush coating, meniscus coating, curtain coating or dip coating. After a short time for the water of the dispersion to evaporate (preferably after 1 to 60 seconds), the coated substrate may then be laminated with a second substrate, the temperature being able, for example, to be 20 to 200° C., preferably 20 to 100° C., and the pressure being able, for example, to be 100 to 3000 kN/m$^2$, preferably 300 to 2000 kN/m$^2$.

In the composite film lamination of the invention, at least two films are bonded to one another with the laminating adhesive preferably such that the peel strength (after 24 h, at 23° C./50% relative humidity) is preferably 2.5 N/15 mm or more or 3 N/15 mm or more or that the films bonded to one another can be parted only with destruction of at least one of the films.

The polymer dispersion of the invention is employed as a one-component composition, i.e. without additional cross-linking agents, more particularly without isocyanate cross-linkers. At least one of the films may be metalized or printed on the side coated with the adhesive. Examples of suitable substrates include polymer films, more particularly films of polyethylene (PE), oriented polypropylene (OPP), undrawn polypropylene (CPP), polyamide (PA), polyethylene terephthalate (PET), polyacetate, cellophane, polymer films coated (vapor coated) with metal, e.g., aluminum (metalized films for short), or metal foils, composed of aluminum, for example. The stated foils and films may be bonded to one another or to a film or foil of another type—for example, polymer films to metal foils, different polymer films to one another, etc. The stated foils and films may also, for example, have been printed with printing inks.

The thickness of the substrate films may amount for example to from 5 to 100 μm, preferably from 5 to 40 μm.

One embodiment of the invention is a composite film produced using one of the aqueous polymer dispersions of the invention described above, the material of a first film being selected from OPP, CPP, PE, PET and PA, and the material of a second film or foil being selected from OPP, CPP, PE, PET, PA and metal foil. In one embodiment of the invention, the first film or foil and/or the second film or foil is printed or metalized on the respective side which is coated with the polymer dispersion of the invention.

Surface treatment of the foil or film substrates ahead of coating with a polymer dispersion of the invention is not absolutely necessary. However, better results can be obtained if the surfaces of the film or foil substrates are modified prior to coating. In this case it is possible to employ customary surface treatments, such as corona treatment, in order to boost the adhesion. The corona treatment or other surface treatments are carried out to the extent required for sufficient wettability with the coating composition. Customarily, corona treatment of approximately 10 watts per square meter per minute is sufficient for this purpose. Alternatively or additionally it is also possible, optionally, to use primers or tie coats between foil or film substrate and adhesive coating. Furthermore, other, additional functional layers may be present on the composite films, examples being barrier layers, print layers, color layers or varnish layers, or protective layers. These functional layers may be located externally, i.e., on the side of the foil or film substrate facing away from the adhesive-coated side, or internally, between foil or film substrate and adhesive layer.

Particular advantages of the film/foil laminates obtainable in accordance with the invention are the following in particular:
- good peel strengths in composite film lamination, immediately after laminating (immediate strength)
- good peel strengths in composite film lamination at elevated temperatures (thermal stability)
- good peel strengths in composite film lamination with exposure of the adhesive to migratable chemicals

EXAMPLES

Abbreviations

IA itaconic acid
AA acrylic acid
S styrene
MA methyl acrylate
nBA n-butyl acrylate
HPA hydroxypropyl acrylate
DAAM diacetoneacrylamide
ADDH adipic dihydrazide
Basonat® LR 9056 water-dispersible polyisocyanate based on isocyanuratized hexamethylene diisocyanate
EHTG 2-ethylhexyl thioglycolate (chain transfer agent)
pphm parts per hundred monomers (parts by weight per 100 parts by weight of monomers)
SC solids content
LT light transmissibility; parameter for determining differences in particle size. In this case the polymer dispersion is diluted to a solids content of 0.01% and the light transmissibility is measured in comparison to pure water.
Tg (calc.) glass transition temperature as calculated by the Fox equation from the glass transition temperature of the homopolymers of the monomers present in the copolymer and their weight fraction:

$$1/Tg = xA/TgA + xB/TgB + xC/TgC + \ldots$$

Tg: calculated glass transition temperature of the copolymer
TgA: glass transition temperature of the homopolymer of monomer A
TgB, TgC: Tg correspondingly for monomers B, C, etc.
xA: mass of monomer A/total mass of copolymer,
xB, xC correspondingly for monomers B, C etc.

Examples 1 and 2

| Monomers | Example 1 (parts by weight) | Example 2 (parts by weight) |
| --- | --- | --- |
| MA | 65.1 | 63.1 |
| nBA | 29.8 | 29.8 |
| HPA | 2 | 2 |
| IA | 1 | 1 |
| AA | 0.1 | 0.1 |
| DAAM | 2 | 4 |

The monomers listed are polymerized in the presence of 0.1 pphm polystyrene seed and 0.1 pphm emulsifier (Disponil® FES 27) in water at a temperature of 85° C. The initiator used is sodium peroxodisulfate. For further stabilization of the polymer particles, a total of 0.35 pphm base (ammonia) is added in the course of polymerization. To bring about a reduction in monomers in the polymer dispersion, a chemical deodorization by means of Rongalite C and tert-butyl hydroperoxide is employed after the polymerization. Following cooling to room temperature, the polymer dispersion is admixed with ADDH.

Example 3 (Comparative Example)

| | Example 3 (parts by weight) |
| --- | --- |
| MA | 67.1 |
| nBA | 29.8 |
| HPA | 2 |
| IA | 1 |
| AA | 0.1 |
| DAAM | — |

The monomers listed are polymerized in the presence of 0.3 pphm polystyrene seed and 0.25 pphm emulsifier (Disponil® FES 27) in water at a temperature of 80° C. The initiator used is sodium peroxodisulfate. For further stabilization of the polymer particles, a total of 0.3 pphm base (ammonia) is added in the course of polymerization. To bring about a reduction in monomers in the polymer dispersion, a chemical deodorization by means of acetone bisulfite and tert-butyl hydroperoxide is employed after the polymerization.

Examples 4 and 5

| | Example 4 (parts by weight) | Example 5 (parts by weight) |
| --- | --- | --- |
| n-BA | 62 | 72.3 |
| S | 35.5 | 23.7 |
| AA | 1.5 | 2 |
| DAAM | 1 | 2 |
| EHTG | 1 | 0.1 |

The monomers listed are polymerized in the presence of 0.1 (example 4) or 0.3 (example 5) pphm polystyrene seed and 0.1 (example 4) or 0.5 (example 5) pphm emulsifier in water at a temperature of 85° C. The initiator used is sodium peroxodisulfate. For further stabilization of the polymer particles, a total of 0.35 pphm base (ammonia) is added in the course of polymerization. To bring about a reduction in monomers in the polymer dispersion, a chemical deodorization by means of acetone bisulfite and tert-butyl hydroperoxide is employed after the polymerization. Following cooling to room temperature, the polymer dispersion is admixed with ADDH.

Example 6 (Comparative Example)

| | Example 6 (parts by weight) |
|---|---|
| n-BA | 63 |
| S | 35.5 |
| AA | 1.5 |
| EHTG | 1 |
| DAAM | — |

The monomers listed are polymerized in the presence of 0.1 pphm polystyrene seed and 0.1 pphm emulsifier (Disponil® LDBS 20) in water at a temperature of 85° C. The initiator used is sodium peroxodisulfate. For further stabilization of the polymer particles, a total of 0.35 pphm base (ammonia) is added in the course of polymerization. To bring about a reduction in monomers in the polymer dispersion, a chemical deodorization by means of acetone bisulfite and tert-butyl hydroperoxide is employed after the polymerization.

Example 7 (Comparative)

Acronal® A 245 aqueous pressure-sensitive adhesive dispersion of an acrylate copolymer Applications-Related Tests Substrates, Laminating Films:

Polyester film, 12 µm thick, corona pretreated, surface tension>38 mN/m;

PE film 60 µm thick, corona pretreated, surface tension>38 mN/m

Adhesive Application:

Directly to the corona-pretreated side of the base film, with an application weight of 2.5-3.0 g/m² dry.

Loop Tack:

The adhesive is applied in an application thickness of 20 µm (dry) to a polyester film 12 µm thick, and drying is carried out at 90° C. for 3 minutes. A strip 25 mm wide and 200 mm long is cut from the coated polyester film, and this strip is formed into a loop. This loop, with the adhesive outward, is clamped at the two ends into the jaws of a tensile testing machine. The loop is moved at a velocity of 300 mm/min onto a polished stainless steel surface in such a way as to produce a contact area of 40×25 mm. The loop is then pulled off from the steel surface at a velocity of 300 mm/min, in the course of which the loop tack is determined as the maximum force in N/25 mm (at room temperature; 20° C.).

Dynamic Peel Resistance at 23° C.:

The base film is fixed on the laboratory coating unit with the pretreated side upward and the adhesive under test is knife-coated directly onto the film. The adhesive is dried for 2 minutes with a hot air blower and then the laminating film is placed on with a manual roller and pressed in the roller laminating station at 70° C. with a roll speed of 5 m/minute and a laminating pressure of 6.5 bar. After that, using a cutting stencil, the laminate is cut into strips 15 millimeters wide and subjected to various storage cycles. Following storage, the laminate strip is pulled apart on a tensile testing machine, and the force required to achieve this is recorded. The test takes place on a tensile testing machine at an angle of 90 degrees and a removal velocity of 100 mm/min. The test strip is opened up on one side, with one of the resultant ends being clamped into the upper jaw and the other into the

TABLE 1

Wet specimen values of examples 1-7

| Example | Polymer composition [parts by weight] | Emulsifier | Tg (calc.) [° C.] | SC [%] | LT [%] | pH |
|---|---|---|---|---|---|---|
| Example 1 | 65 MA, 30 nBA, 2 HPA, 1 IA, 2 DAAM; 1.6 ADDH | 0.1% Disponil® LDBS 20 | −9 | 45.2 | 56 | 7.9 |
| Example 2 | 63 MA, 30 nBA, 2 HPA, 1 IA, 4 DAAM; 3.2 ADDH | 0.1% Disponil® LDBS 20 | −8 | 45.2 | 57 | 7.3 |
| Example 3 comparative | 63 MA, 34 nBA, 2 HPA, 1 IA | 0.25% Disponil® FES 27 | −14 | 51.5 | 71 | 6.8 |
| Example 4 | 62 nBA, 35.5 S, 1.5 AA, 1 DAAM; 0.5 ADDH; 1 EHTG | 0.1% Disponil® LDBS 20 | −5 | 45 | 34 | 6.9 |
| Example 5 | 72 nBA, 24 S, 2 AA, 2 DAAM; 1 ADDH; 0.1 EHTG | 0.5% Disponil® LDBS 20 | −16 | 46 | 50 | 6.0 |
| Example 5a | 72 nBA, 24 S, 2 AA, 2 DAAM; 1 ADDH; 0.1 EHTG | 2% Disponil® LDBS 20 | −16 | 47 | 50 | 6.0 |
| Example 6 comparative | 63 nBA, 35.5 S, 1.5 AA; 1 EHTG | 0.1% Disponil® LDBS 20 | −6 | 45.5 | 34 | 7.6 |
| Example 7 | 63 nBA, 27 2-EHA, 5 MA, 3 S, 1 AA, 0.7 DAAM; 0.3 ADDH | 1.4% Lumiten® I-SC/1% Disponil® FES77 | −45 | 52 | 75 | 7.5 | lower jaw of the tensile testing machine, and the test is commenced. The result reported is the average of the force from 3 individual measurements, in N/15 mm.

The specimens can be tested after different storage conditions:
1. immediately after laminating (<3 min)
2. after 24 h (at 23° C./50% rel. humidity)
3. after 24 h (at 23° C./50% rel. humidity)+7 d at 50° C. in ketchup Dynamic Peel Resistance at 90° C.:

The base film is fixed on the laboratory coating unit with the pretreated side upward and the adhesive under test is knife-coated directly onto the film. The adhesive is dried for 2 minutes with a hot air blower and then the laminating film is placed on with a manual roller and pressed in the roller laminating station at 70° C. with a roll speed of 5 m/minute and a laminating pressure of 6.5 bar. The laminate is then cut into strips 15 millimeters wide using the cutting stencil, and stored for a minimum of 24 hours at 23° C./50% relative humidity. Following storage, the laminate strip is pulled apart on a tensile testing machine with climate chamber at a temperature of 90° C., and the force required to achieve this is recorded. The test takes place on a tensile testing machine with climate chamber, at a removal velocity of 100 mm/min. The test strip is opened up on one side, with one of the resultant ends being clamped into the upper jaw and the other into the lower jaw of the tensile testing machine, and the test is commenced. The measurement starts after a waiting time of 1 minute, for conditioning of the test strip. Evaluation: The result reported is the average of the force from three individual measurements, in N/15 millimeters.

Assessment of the Fracture Mode:
A=adhesive layer remains completely on the base film (adhesive fracture)
K=separation in the adhesive layer without detachment from a material (cohesive fracture)
MB=partial or complete fracture of a film

TABLE 2

Adhesive values of the adhesive dispersions

| Ex. | Addition of 6%, solids on solids, of Basonat ® LR 9056 | Peel strength after <3 min at 23° C. [N/15 mm]/ fracture mode | Peel strength after 24 h at 23° C. [N/15 mm]/ fracture mode | Peel strength after 24 h at 23° C. + 7 d at 50° C. in ketchup [N/15 mm]/ fracture mode | Peel strength at 90° C. [N/15 mm]/ fracture mode |
|---|---|---|---|---|---|
| 1 | no | 2.2 A | 4.0 MB | 1.4 A | 1.4 A |
| 2 | no | 1.8 A | 3.5 MB | 1.8 A | 1.1 A |
| 3 | no | 0.5 A | 0.7 A | 0.1 K | 0.4 K |
| 3 | yes | 1.9 A | 3.2 MB | 1.9 A | 0.6 K |
| 4 | no | 2.6 A | 4.4 MB | 1.6 A | 0.7 K |
| 5 | no | 2.8 A | 4.2 MB | 3.4 A | 0.5 K |
| 5a | no | 1.3 | 4.0 MB | 3.2 A | 0.5 K |
| 6 | no | 1.0 A | 1.2 A | 0.1 K | 0.1 K |
| 6 | yes | 2.5 A | 4.1 MB | 1.7 A | 0.7 K |
| 7 | no | 1.1 A | 2.3 K | 1.1 K | 0.4 K |

This table shows that the examples according to the invention can be used very effectively as a one-component adhesive in composite film lamination, particularly if high thermal stability and resistance to migratable chemicals are required.

The preferred emulsifier amount of <1 pphm produces a particularly high immediate strength of the laminates produced using the dispersions of the invention (example 5 vs. example 5a).

The invention claimed is:

1. A method for producing a composite film, comprising:
    bonding, without UV cross-linking, at least two films together with a one-component laminating adhesive that comprises no UV-crosslinkable components;
    wherein the laminating adhesive being present in the form of an aqueous polymer dispersion, and the aqueous polymer dispersion comprising polymer particles in dispersion in water that are obtained by radical emulsion polymerization of monomers comprising
    a) 90 to 99.4 wt %, based on the total amount of monomers, of a mixture of C1 to C8 alkyl acrylates and styrene,
    b) 0.1 to 5 wt %, based on the total amount of monomers, of at least one monomer having at least one acid group, and
    c) 0.1 to 5 wt %, based on the total amount of monomers, of at least one ethylenically unsaturated compound having at least one functional group selected from the group consisting of keto groups and aldehyde groups;
    where the aqueous polymer dispersion comprises at least one compound A which has at least two functional groups that are able to enter into a crosslinking reaction with the keto groups or with the aldehyde groups, and is present in an amount of up to 1.6 wt % based on the total amount of the monomers;
    where the molar ratio of the groups of the compound A that are reactive with keto groups or with aldehyde groups to the keto and aldehyde groups of the monomer c) is in a range from 1:1.3 to 1.3:1;
    where, in the composite film, the at least two films are bonded to one another with the laminating adhesive so firmly that the peel strength, measured 24 h after laminate production and at 23° C., is 2.5 N/15 mm or more or that the films bonded to one another are partable only with destruction of at least one of the films.

2. The method according to claim 1, wherein the laminating adhesive has a tack of less than 1.7 N/25 mm, measured as loop tack in an applied thickness of 20 μm, applied to a polyester film 12 μm thick, and measured on steel at room temperature (20° C.) with a removal velocity of 300 mm/min.

3. The method according to claim 1, wherein the polymer particles are produced from monomers further comprising
    d) 0 to 10 wt %, based on the total amount of monomers, of other monomers, different from the monomers a) to c).

4. The method according to claim 3, wherein the other monomers d) are present, and are selected from the group consisting of acrylamide, methacrylamide, N-methylolacrylamide, N-methylolmethacrylamide, phenyloxyethyl glycol mono(meth)acrylate, monomers comprising hydroxyl groups, monomers comprising amino groups, nitriles of alpha,beta-monoethylenically unsaturated C3-C8 carboxylic acids, bifunctional monomers which as well as an ethylenically unsaturated double bond have at least one glycidyl group, oxazoline group, ureido group or ureido-analogous group, and crosslinking monomers which have more than one radically polymerizable group.

5. The method according to claim 3, wherein the monomers b) are selected from the group consisting of acrylic acid, methacrylic acid, and itaconic acid, and the other monomers d) are present, and are selected from the group consisting of hydroxyalkyl (meth)acrylates having 1 to 10 carbon atoms in the alkyl group.

6. The method according to claim 1, wherein the monomers c) are selected from the group consisting of acrolein, methacrolein, vinyl alkyl ketones having 1 to 20 carbon atoms in the alkyl radical, formylstyrene, alkyl (meth) acrylates having one or two keto or aldehyde groups or having one aldehyde and one keto group in the alkyl radical, N-oxoalkyl(meth)acrylamides, acetoacetyl (meth)acrylate, acetoacetoxyethyl (meth)acrylate, and diacetoneacrylamide.

7. The method according to claim 1, wherein the compound A comprises a compound having hydrazide, hydroxylamine, oxime ether, or amino groups.

8. The method according to claim 1, wherein compound A is a dicarboxylic dihydrazide having 2 to 10 carbon atoms, and monomer c) is selected from the group consisting of acetoacetyl (meth)acrylate, acetoacetoxyethyl (meth)acrylate, and diacetoneacrylamide.

9. The method according to claim 1, wherein compound A is adipic dihydrazide and monomer c) is diacetoneacrylamide.

10. The method according to claim 1, wherein the polymer particles are produced from monomers comprising
   b) 0.5 to 3 wt %, based on the total amount of monomers, of at least one monomer selected from the group consisting of acrylic acid, methacrylic acid, and itaconic acid,
   c) 0.1 to 5 wt %, based on the total amount of monomers, of at least one ethylenically unsaturated compound having at least one keto group, selected from the group consisting of acetoacetyl (meth)acrylate, acetoacetoxyethyl (meth)acrylate, and diacetoneacrylamide, and
   d) 0 to 5 wt %, based on the total amount of monomers, of other monomers, different from the monomers a) to c), selected from the group consisting of acrylamide, methacrylamide, N-methylolacrylamide and N-methylolmethacrylamide, phenyloxyethyl glycol mono(meth) acrylate, monomers comprising hydroxyl groups, monomers comprising amino groups, nitriles of alpha, beta-monoethylenically unsaturated C3-C8 carboxylic acids, bifunctional monomers which as well as an ethylenically unsaturated double bond have at least one glycidyl group, oxazoline group, ureido group or ureido-analogous group, and crosslinking monomers which have more than one radically polymerizable group,
   and where compound A is a dicarboxylic dihydrazide having 2 to 10 carbon atoms.

11. The method according to claim 1, wherein the material of the films to be bonded is selected from the group consisting of polyethylene, oriented polypropylene, undrawn polypropylene, polyamide, polyethylene terephthalate, polyacetate, cellophane, metalized films, and metal foils.

12. The method according to claim 1, wherein the polymer particles have a glass transition temperature of −40 to +15° C.

13. The method according to claim 1, wherein less than 1 part by weight of emulsifier is used per 100 parts by weight of monomers in the emulsion polymerization.

14. The method according to claim 1, wherein the monomers comprise:
   b) 0.5 to 3 wt %, based on the total amount of monomers, of at least one monomer selected from the group consisting of acrylic acid, methacrylic acid, and itaconic acid,
   c) 0.1 to 5 wt %, based on the total amount of monomers, of at least one ethylenically unsaturated compound selected from the group consisting of acetoacetyl (meth)acrylate, acetoacetoxyethyl (meth)acrylate, and diacetoneacrylamide, and
   d) 0.1 to 5 wt % of a hydroxyalkyl (meth)acrylate having 1 to 10 carbon atoms in the alkyl group or 0.1 to 4 wt % of a chain transfer agent having a thiol group;
   and where compound A is a dicarboxylic dihydrazide having 2 to 10 carbon atoms and the films are polyester films.

15. The method according to claim 14, wherein compound A is adipic dihydrazide and monomer c) is diacetoneacrylamide.

16. The method according to claim 1, wherein the monomers comprise:
   b) 1.0 to 3 wt %, based on the total amount of monomers, of at least one monomer selected from the group consisting of acrylic acid, methacrylic acid, and itaconic acid,
   c) 1.0 to 5 wt %, based on the total amount of monomers, of at least one ethylenically unsaturated compound selected from the group consisting of acetoacetyl (meth)acrylate, acetoacetoxyethyl (meth)acrylate, and diacetoneacrylamide, and
   d) 1.0 to 5 wt % of a hydroxyalkyl (meth)acrylate having 1 to 10 carbon atoms in the alkyl group or 1.0 to 4 wt % of a chain transfer agent having a thiol group;
   and where compound A is adipic dihydrazide.

17. The method according to claim 16, wherein compound A is present in an amount of up to 1 wt % based on the total amount of the monomers.

18. The method according to claim 16, wherein compound A is present in an amount of up to 0.5 wt % based on the total amount of the monomers.

19. The method according to claim 1, wherein the monomers are free of isocyanate crosslinkers.

* * * * *